United States Patent Office 3,317,478
Patented May 2, 1967

3,317,478
POLYMERS OF POLYACROLEIN-FORMALDE-
HYDE REACTION PRODUCTS AND CAR-
BOXYLIC ACID ESTERS THEREOF WITH
ALDEHYDES
Ilse Ursula Nebel, Oberlar, and Gerhard Bier, Troisdorf,
Germany, assignors to Dynamit Nobel Aktiengesell-
schaft, Troisdorf, Bezirk Cologne, Germany, a corpo-
ration of Germany
No Drawing. Filed Nov. 30, 1964, Ser. No. 414,884
Claims priority, application Germany, Dec. 21, 1963,
D 43,232
16 Claims. (Cl. 260—73)

In the transportation of formaldehyde and polyacrolein in the presence of alkalies, macromolecular polyalcohols develop which have as their principal component the following approximate composition:

$$\left(-CH_2-\underset{\underset{CH_2OH}{|}}{\overset{\overset{CH_2OH}{|}}{C}}-\right)_n$$

$n$ can be a fairly large number. In addition to the reaction with formaldehyde, Cannizzaro reactions, for example, also take place, so that the chain molecules also contain COOH or COOMe groups.

It has now been found that, by the acetalization of the polyacrolein-formaldehyde reaction products (PAF) or their carboxylic acid esters with aldehydes, new products with valuable properties can be obtained. These acetals may contain various structures. For example, the acetal formation can take place through two methylol groups on the same carbon:

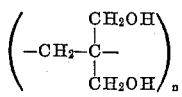

or it can take place through methylol groups on different carbons:

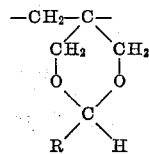

In the case of the first formula, a six-member ring develops, and in the case of the second formula, an eight-member ring. Furthermore, rings with a larger number of ring atoms may form. In addition to the acetal groups, the new products contain ester groups which evidently developed through the reaction of the COOH side groups with CH₂OH side groups. Surprisingly, most of the products show good solubility, so that it must be assumed that both in the case of acetal formation and in the case of ester formation, intramolecular reactions take place. In the case of the esters, the following structure is to be assumed:

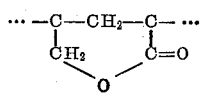

or even larger rings. Furthermore, the polymers also contain free hydroxyl groups, which are important for many possibilities of exploitation. These are carbinol groups (—CH₂OH) of PAF, which have not been affected by the acetalization nor by the esterification (lactonization).

For the manufacture of the new acetals, PAF's or their esters are transposed with aldehydes or aldehyde mixtures in water or organic solvents, in a manner conventional for acetalization. Thus the reaction is carried out in the presence of an acid catalyst, such as a mineral acid or an organic sulfonic acid and at various temperatures, preferably between 20 and about 90° C.

Aldehydes in general are suitable for use in the invention. The aldehyde can be aliphatic, aromatic, saturated or unsaturated. Mixtures of aldehydes can be used. The aldehyde can be of the formula RCHO wherein R is hydrogen, aliphatic, cycloaliphatic, aromatic or heterocyclic.

The carboxylic acid from which the ester is formed can, in general, be any carboxylic acid.

The solubility of the acetals depends upon the conditions and the aldehyde used. They may be capable of swelling in pyridine and dimethylformamide, and soluble in dioxane, tetrahydrofuran, cyclohexanone, cyclohexanol, and mixtures of same with methanol and acetic acid ester.

The new acetals have a broad field of application. They can be worked from solutions or thermoplastically. They are suitable, for example, for the manufacture of sheets and filaments. They can be used in the lacquer industry and in the textile industry. Finally, they can be added to other substances of high molecular weight, in order to change their properties.

Thus, the invention provides a process for production of polymer which comprises the step of contacting a hydrocarbon polymer chain having as substituents carbinol or carboxylic acid esters of carbinol radicals with aldehyde for reaction of the said substituents and the aldehyde to form acetal substituents on the polymer chain. The hydrocarbon polymer chain with substituents can be represented as follows:

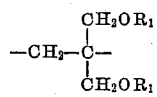

wherein each $R_1$ is hydrogen or acyl. The aldehyde can be of the formula RCHO wherein R is a radical having a carbon atom directly connected to the carbon atom shown. The polymer product having the acetal substituent can have the following formula

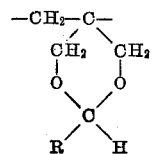

The substituents on the hydrocarbon polymer chain, particularly disclosed herein as carbinol groups or the esters of such groups, can be represented as being substituents of the formula —CH$_2$O— wherein the C atom is bonded directly to a C atom of said chain.

The products of the invention are polymers having a hydrocarbon polymer chain and having substituents thereof according to the following formula:

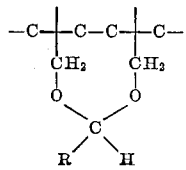

In this formula R is hydrogen or a radical having a carbon atom directly connected to the carbon atom to which the radical R is joined. The substituents can be joined to the same or different carbon atom or atoms of the chain. In the representation hydrogen atoms directly connected to carbon atoms of the polymer chain are not shown. All valences of carbon atoms of the chain not satisfied by the substituents indicated are satisfied by hydrogen.

*Example 1*

50 g. of glacial acetic acid are poured over 11 g. of water-soluble polymer (PAF) and thoroughly mixed with 32 grams of butyraldehyde. Then 1.5 g. of concentrated HCl (dissolved in 5 ml. H$_2$O) are added, and the mixture is heated for 20 hours at 65° C. After the reaction is ended, the settlings are separated and the polymer is isolated by pouring the solution in glacial acetic acid into water. The polymer is very easily soluble in dioxane, tetrahydrofuran, pyridine, and mixtures of same with methanol and acetic acid ester.

*Example 2*

10 g. of acetylated polymer (PAF acetate) are dissolved with stirring in 18.6 g. of glacial acetic acid. Then 8 g. of Formalin (in a 39% solution), to which 1.36 g. of concentrated sulfuric acid have been added, are added to the solution, and the mixture is heated at 70° C. for 24 hours. The reaction mixture is diluted with water and the polymer is isolated from it. The dried product swells in pyridine and dimethylformamide.

*Example 3*

12 g. water-soluble polymer (PAF) are covered with 54 g. glacial acetic acid and thoroughly mixed with 30 g. chloral. The solution is heated for 4 hours at 65° C. After the reaction is ended the polymer is dissolved. By pouring into water the chlorous polymer can be isolated, e.g. it is soluble in acetone, methanol, isopropyl alcohol, cyclohexanol, cyclohexanone, dioxane, tetrahydrofurane and pyridine.

*Example 4*

12 g. water-soluble polymer (PAF) are covered with 54 g. glacial acetic acid thoroughly mixed with 30 g. chloral and hereafter 1.5 g. concentrated HCl (dissolved in 5 ml. H$_2$O) are added. This solution is heated for 4 hours at 65° C. After the reaction is ended the settlings are separated and the chlorous polymer is isolated by pouring into water. The polymer is soluble, e.g. in cyclohexanol, cyclohexanone, pyridine, dimethylformamide; it swells in dioxane, tetrahydrofurane, isopropyl alcohol, methanol.

*Example 5*

1.1 g. water-soluble polymer (PAF) are covered with 5 g. glacial acetic acid mixed with 1.4 g. n-heptaldehyde and then 160 mg. concentrated HCl (dissolved in 0.5 ml. H$_2$O) are added. This solution is heated for 16 hours at 60° C. Then the polymer is in solution and isolating is effected by pouring into water. The polymer is soluble in pyridine, dioxane, tetrahydrofurane, dimethylformamide and NaOH-lye.

*Example 6*

1.1 g. water-soluble polymer (PAF) are covered with 5 g. glacial acetic acid, mixed with 3.4 g. stearaldehyde and hereafter there are added 150 mg. concentrated HCl (dissolved in 0.5 ml. H$_2$O). The solution is heated for 6 hours at 65° C. After the reaction is ended the polymer is dissolved and the acetal is separated down. The complete isolation is done by dilution with water. The polymer swells in pyridine and dimethylformamide.

*Example 7*

11 g. water-soluble polymer (PAF) are covered with 50 g. glacial acetic acid, mixed with 12 g. furfurol and hereafter 1.5 g. concentrated HCl are added (dissolved in 5 ml. H$_2$O). The solution is heated for one hour at 65° C. Then the reactant is soluble and the acetal is isolated, as usual, by pouring into water. The polymer is soluble in dimethylformamide, pyridine and NaOH-lye.

*Example 8*

11 g. water-soluble polymer (PAF) are covered with 50 g. glacial acetic acid, mixed with 6.5 g. benzaldehyde and then are added 1.5 g. concentrated HCl (dissolved in 5 ml. H$_2$O). The solution is heated for 6 hours at 65° C. The isolation is done as shown in the examples already mentioned. The polymer is soluble in tetrahydrofurane, pyridine, NaOH-lye and dimethylformamide.

*Example 9*

The reaction with hexahydrobenzaldehyde (14 g.) is effected as shown in Example 8. The polymer is soluble in pyridine, dimethylformamide and NaOH-lye.

*Example 10*

The reaction with formaldehyde as a 39% aqueous solution (0.1 g.) is done as in Example 8. The polymer is soluble in pyridine, dimethylformamide and NaOH-lye.

*Example 11*

The reaction with acetaldehyde (5.5 g.) is done as already shown in Example 8. The polymer is soluble in pyridine, dimethylformamide and NaOH-lye; it swells in cyclohexanol, dioxane and tetrahydrofurane.

*Example 12*

The reaction with isobutyraldehyde (16 g.) is effected as shown in Example 8. The polymer is soluble e.g. in tetrahydrofurane, dioxane, pyridine, dimethylformamide, cyclohexanol, cyclohexanone.

*Example 13*

The reaction with acrolein (7 g.) is done as shown in Example 8. The polymer is soluble in pyridine and dimethylformamide.

*Example 14*

The reaction with crotonaldehyde (8 g.) is done as shown in Example 8. The polymer is soluble in dimethylformamide, NaOH-lye and pyridine.

*Example 15*

10 g. benzoylized polymer (PAF-benzoat) are dissolved by stirring in 18.6 glacial acetic acid. Hereafter 8 g. Formalin (39%) are added together with 1.36 g. H$_2$SO$_4$ (concentrated). The solution is heated for 24 hours at 70° C. The reaction mixture is diluted with water and the polymer is isolated from it. The polymer swells in pyridine, dioxane, tetrahydrofurane and dimethylformamide.

The starting materials mentioned in the examples were prepared as follows:

(a) *Water-soluble PAF.*—2 kilograms of water are added to 40 g. of polyacrolein made by the method of Houben-Weyl (Methoden der organischen Chemie, Makromolekulare Stoffe, part 1, vol. XIV, p. 1084) and the mixture is heated to 60° C. At this temperature, 288 g. of formaldehyde in the form of a 36% aqueous solution are dripped in, and then, within 10 minutes, 24 g. of sodium hydroxide in 100 g. of water are dripped in. A clear solution develops. It is stirred for another 17 hours at a temperature between 50° and 60° C. Then it is neutralized with 2 N acetic acid and the water is vacuum distilled until the reaction product remains in the flask in a viscous state. The polymer is precipitated with methanol, isolated and washed free of sodium acetate with methanol. The polymer is completely water-soluble.

(b) *PAF insoluble in water.*—2 kg. of water are added to 40 g. of polyacrolein, produced as described under (a), and the mixture is heated to 60° C. At this temperature, 288 g. of formaldehyde are dripped in as a 36% aqueous solution, and then, within 10 minutes, 24 g. of sodium hydroxide in 100 g. of water are dripped in. A clear solution is produced. This solution is stirred for another 17 hours at a temperature between 50 and 60° C. Then it is acidified with 280 ml. of about 2 N hydrochloric acid; the precipitated polymeric substance is washed free of chloride and rapidly dried. The polymer is water-insoluble, but soluble in alkalies.

(c) *PAF acetate.*—10 g. water insoluble PAF are heated for 24 hours at 75° C. with 760 ml. of pyridine and 40 ml. of acetic acid anhydride. Then the reaction mixture is poured into water; the precipitated solids are isolated, washed and dried.

(d) *PAF-benzoat.*—5 g. water-soluble PAF are dissolved in 15 ml. water and there are added 210 ml. of a 10% NaOH-lye. When shaking 30 ml. benzoychloride are added. The ester falls out at once and is drawn off, washed and dried.

The products of the examples can be utilized for films for the protective covering of various materials. Thus the product of Example 1 can be dissolved in a solvent as is mentioned in Example 1 as suitable for dissolving the product, and the resulting solution can be applied to the surface to be protected. The solvent can be evaporated, whereupon a continuous film of the polymer product will be deposited and will serve as proteciton from water penetration and from air penetration. The product of Example 2 can be heated to thermoplastic condition and then extruded into a continuous film, in known manner, and such film can be used as a protective covering, as plastic film such as polyethylene film is used as a protective covering.

While the invention has been described with respect to particular embodiments thereof, these embodiments are merely representative and do not serve to define the limits of the invention.

What is claimed is:

1. Process for production of polymer which comprises the step of contacting polyacrolein formaldehyde reaction product or carboxylic acid esters thereof with aldehyde in the presence of an acid catalyst for reaction of said substituents and the aldehyde to form acetyl substituents on the polymer chain.

2. Process according to claim 1, wherein said aldehyde is of the formula RCHO wherein R is selected from the group consisting of hydrogen, aliphatic, cycloaliphatic, heterocyclic and aromatic radical.

3. Process according to claim 1, wherein the temperature for said contacting is about 20–90° C.

4. Process according to claim 1, wherein the aldehyde is butyraldehyde, formaldehyde chloral, n-heptaldehyde, stearaldehyde furfurol, benzaldehyde, hexahydrobenzaldehyde, acetaldehyde, isobutyraldehyde, acrolein, crotonaldehyde.

5. Process according to claim 1, wherein the said contacting is carried out in a medium comprising glacial acetic acid.

6. Process according to claim 1, wherein polyacrolein formaldehyde and an aldehyde are contacted.

7. Process according to claim 6, wherein the aldehyde is butyraldehyde, formaldehyde, chloral, n-heptaldehyde, stearaldehyde furfurol, benzaldehyde, hexahydrobenzaldehyde, acetaldehyde, isobutyraldehyde, acrolein, crotonaldehyde.

8. Process according to claim 6, wherein said contacting is carried out in a medium comprising glacial acetic acid and at a temperature of about 20–90° C.

9. Process for production of polymer having acetal substituents which comprises the step of contacting reactant polymer selected from the group consisting of polyacrolein formaldehyde reaction products and carboxylic acid esters thereof with aldehyde in the presence of an acid catalyst for reaction to produce said polymer having acetal substituents.

10. Process for production of polymer having acetal substituents which comprises the step of contacting a polymer having a hydrocarbon polymer chain having as substituents groups of the formula —CH$_2$O— wherein the C atom is bonded directly to a C atom of said chain, in the presence of an acid catalyst with aldehyde for reaction to produce said polymer having acetal substituents.

11. Process for production of polymer which comprises the step of contacting a polymer having a hydrocarbon polymer chain having substituents as shown by the following formula:

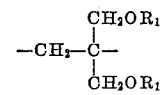

wherein each R$_1$ is selected from the group consisting of hydrogen and acyl, with aldehyde of the formula RCHO wherein R is a radical having a carbon atom directly connected to the carbon atom shown, in the presence of an acid catalyst for production of polymer having said hydrocarbon polymer chain with substituents as shown by the following formula:

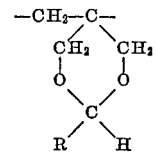

wherein R is as above.

12. Polymer having a hydrocarbon polymer chain and having substituents thereon according to the following formula:

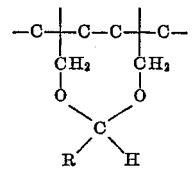

wherein R is selected from the group consisting of hydrogen and a radical having a carbon atom directly connected to the carbon atom to which the radical R is joined, wherein the substituents are joined to the same or different carbon atoms of the chain.

13. Polymer according to claim 12, wherein R is a radical selected from the group consisting of hydrogen, aliphatic, cycloaliphatic, heterocyclic and aromatic.

14. Polymer according to claim 12, wherein R is the residue from butyraldehyde, formaldehyde, chloral, n-heptaldehyde, stearaldehyde furfurol, benzaldehyde, hexahydrobenzaldehyde, acetaldehyde, isobutyraldehyde acrolein, crotonaldehyde.

15. Polymer having a hydrocarbon polymer chain having substituents thereon according to the following formula:

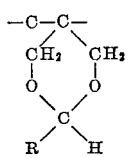

wherein R is selected from the group consisting of hydrogen and a radical having a carbon atom directly connected to the carbon atom to which the radical R is joined.

16. Polymer according to claim 15, wherein R is a radical selected from the group consisting of hydrogen, aliphatic, cycloaliphatic and aromatic.

References Cited by the Examiner

UNITED STATES PATENTS

| 2,485,239 | 10/1949 | Izard | 260—67 |
| 2,696,477 | 12/1954 | Gagarine et al. | 260—67 |
| 2,862,908 | 12/1958 | Jones et al. | 360—73 |

OTHER REFERENCES

Kunststoffe: vol. 53, July, 1963, pp. 424–436. English translation pp. 11–22.

SAMUEL H. BLECH, *Primary Examiner.*

WILLIAM H. SHORT, *Examiner.*

L. M. PHYNES, *Assistant Examiner.*

UNITED STATES PATENT OFFICE
CERTIFICATE OF CORRECTION

Patent No. 3,317,478                      May 2, 1967

Ilse Ursula Nebel et al.

It is hereby certified that error appears in the above numbered patent requiring correction and that the said Letters Patent should read as corrected below.

Column 1, line 14, for "transportation" read --transposition--; column 4, line 41, for (0.1 g.)" read -- (10.1 g.) --.

Signed and sealed this 2nd day of January 1968.

(SEAL)
Attest:

Edward M. Fletcher, Jr.                      EDWARD J. BRENNER

Attesting Officer                          Commissioner of Patents